No. 800,970. PATENTED OCT. 3, 1905.
B. F. BELLOWS.
MATRIX DISTRIBUTING MECHANISM.
APPLICATION FILED OCT. 13, 1904.

No. 800,970. PATENTED OCT. 3, 1905.
B. F. BELLOWS.
MATRIX DISTRIBUTING MECHANISM.
APPLICATION FILED OCT. 13, 1904.

Witnesses.
E. B. Gilchrist
B. W. Brockett.

Inventor.
Benjamin F. Bellows
By Thurston & Bates
attys.

Fig. 13.

UNITED STATES PATENT OFFICE.

BENJAMIN F. BELLOWS, OF CLEVELAND, OHIO, ASSIGNOR, BY MESNE ASSIGNMENTS, TO ELECTRIC COMPOSITOR COMPANY, OF JERSEY CITY, NEW JERSEY, A CORPORATION OF NEW JERSEY.

MATRIX-DISTRIBUTING MECHANISM.

No. 800,970.     Specification of Letters Patent.     Patented Oct. 3, 1905.

Application filed October 13, 1904. Serial No. 228,273.

*To all whom it may concern:*

Be it known that I, BENJAMIN F. BELLOWS, a citizen of the United States, residing at Cleveland, in the county of Cuyahoga and State of Ohio, have invented a certain new and useful Improvement in Matrix-Distributing Mechanism, of which the following is a full, clear, and exact description, reference being had to the accompanying drawings.

This invention is an improvement upon the matrix-distributing mechanism which forms the subject-matter of my pending application, Serial No. 215,043, which is itself an improvement upon the distributing mechanism disclosed in my prior patent, No. 598,408. The prior distributing mechanism referred to includes a system of channels which respectively discharge at their lower ends into the matrix-magazines. These channels converge from their lower ends upward, becoming gradually merged together by the elimination of the dividing-partitions until at the upper end they are all merged together into a single channel or throat. At the upper ends of the dividing-partitions there are switches connected in groups, and these switches by their movement severally connect the channel above them with either branch thereof below them. It also includes a distributing-rail, mechanism for moving the matrices along the same, and mechanism for transferring the matrices singly from said rail into the throat of the distributing-channels, and it also includes mechanism by which each matrix before it is delivered into said throat is employed to cause operation of the required switches in such manner as to open up one channel from said throat to the magazine of the matrix which is so employed.

This invention consists of novel mechanism by which the matrices are withdrawn singly from the line on the distributing-rail and are used to cause the required switches to open up a channel from the throat to the magazine of the matrix so used and to the mechanism for then discharging said matrix into the throat of the distributing-channel.

The objects of the invention are to simplify the mechanism heretofore employed for this purpose and to make it more certain in its operation.

In the mechanism shown in the drawings the necessary operation of the switches and the other mechanism referred to is produced by a greatly-reduced number of parts in comparison with the mechanism previously employed, many of the electrical devices previously used have been dispensed with, and the operation of the switches by the matrices is not dependent, as heretofore, upon a nice electrical contact between the face of the matrix and the ends of contact-pins.

The invention may be summarized as the construction and combination of parts hereinafter described, and pointed out definitely in the claims.

Referring to the parts shown in the drawings, 3 represents the distributing-rail, onto which a line of matrices 1 may be delivered in any suitable manner.

87 represents the propeller-slide, which when the matrices are on said rail is under the influence of a force constantly tending to impel it to move to the right. Mechanism for so moving this slide may be substantially the same as shown by the application referred to, which includes the rack-teeth 88 on slide 87, the pinion 89, which engages with them, and a vertically-movable rack-bar 90, which also engages with said pinion, and whose weight is sufficient to impart the necessary movement to slide 87. Any other suitable mechanism may, however, be employed for this purpose. The propeller-slide has a forwardly-projecting spring-actuated presser-bar 91, which engages with the rearmost matrix in line, and thereby pushes the line along the rail toward the right end thereof.

Figure 1:
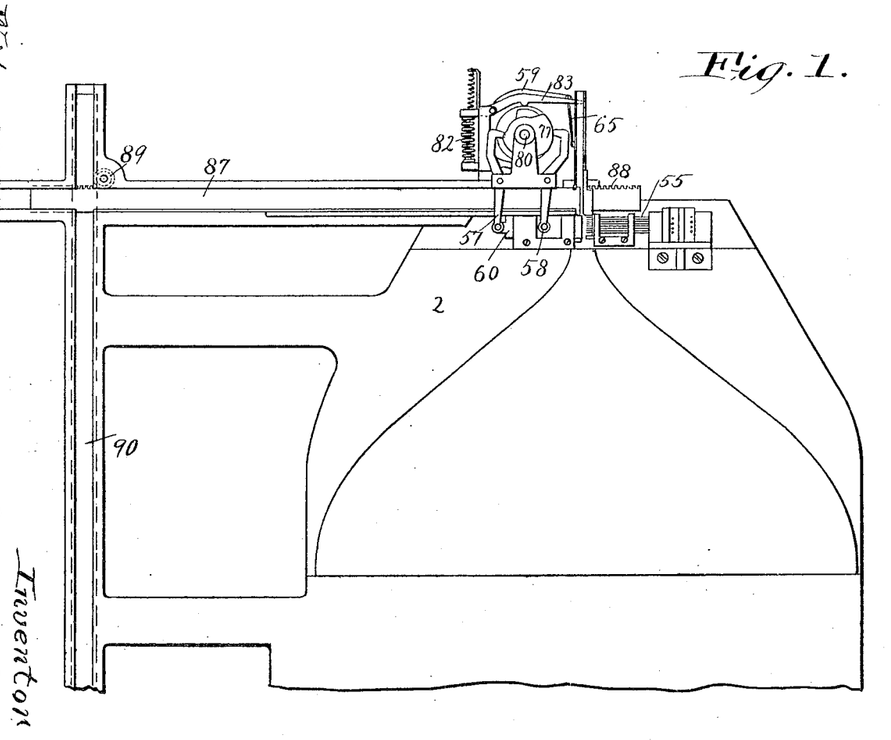
Figure 1 is a front elevation of the upper part of a machine containing the present invention.
Figure 2:
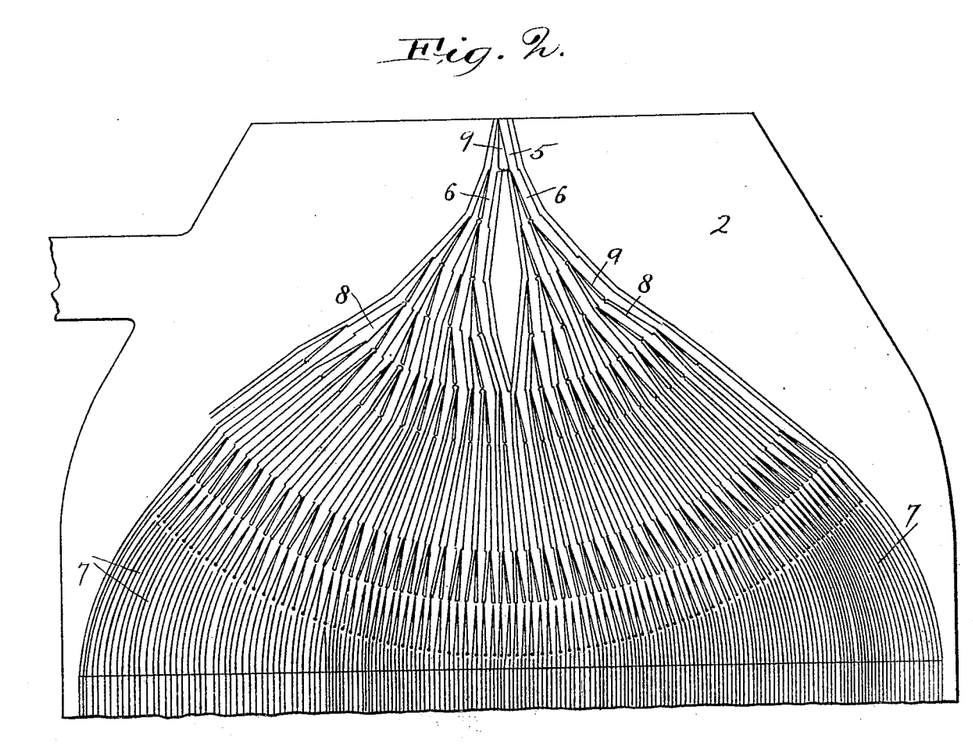
Fig. 2 is a front view of the distributing-channels, the switches therein, and the upper end of the magazines into which the channels discharge.
Figure 3:
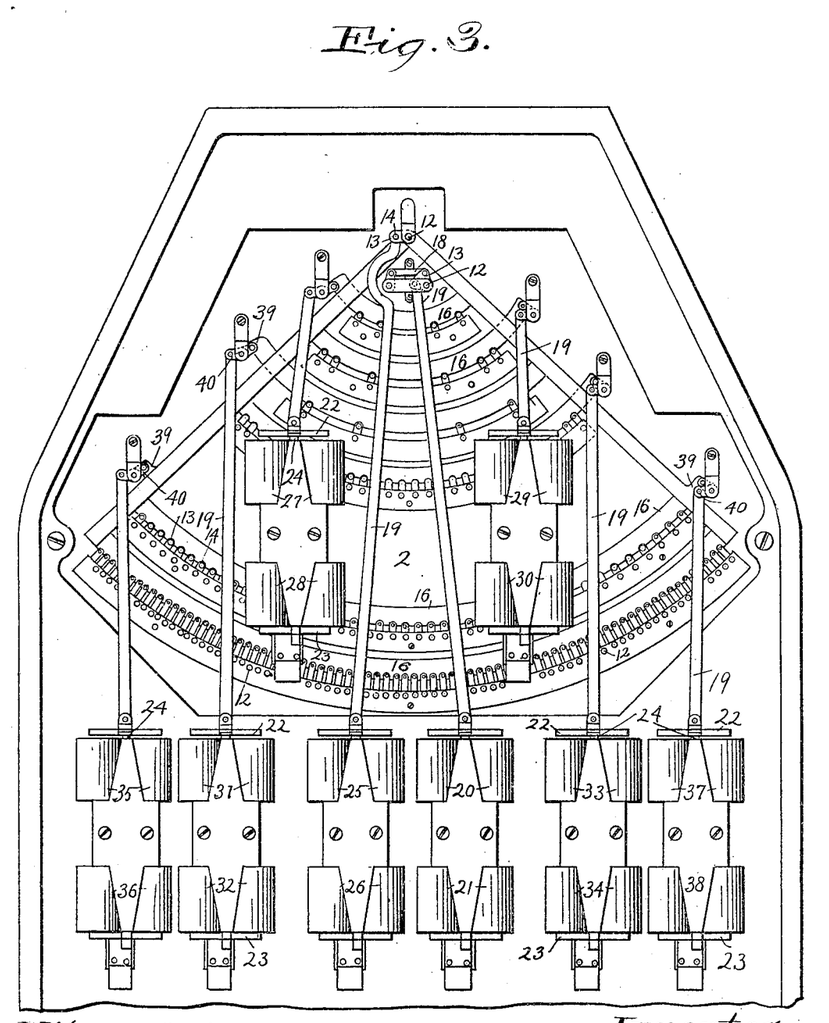
Fig. 3 is a rear elevation, showing the mechanism directly associated with the movement of said switches.
Figures 4, 5:
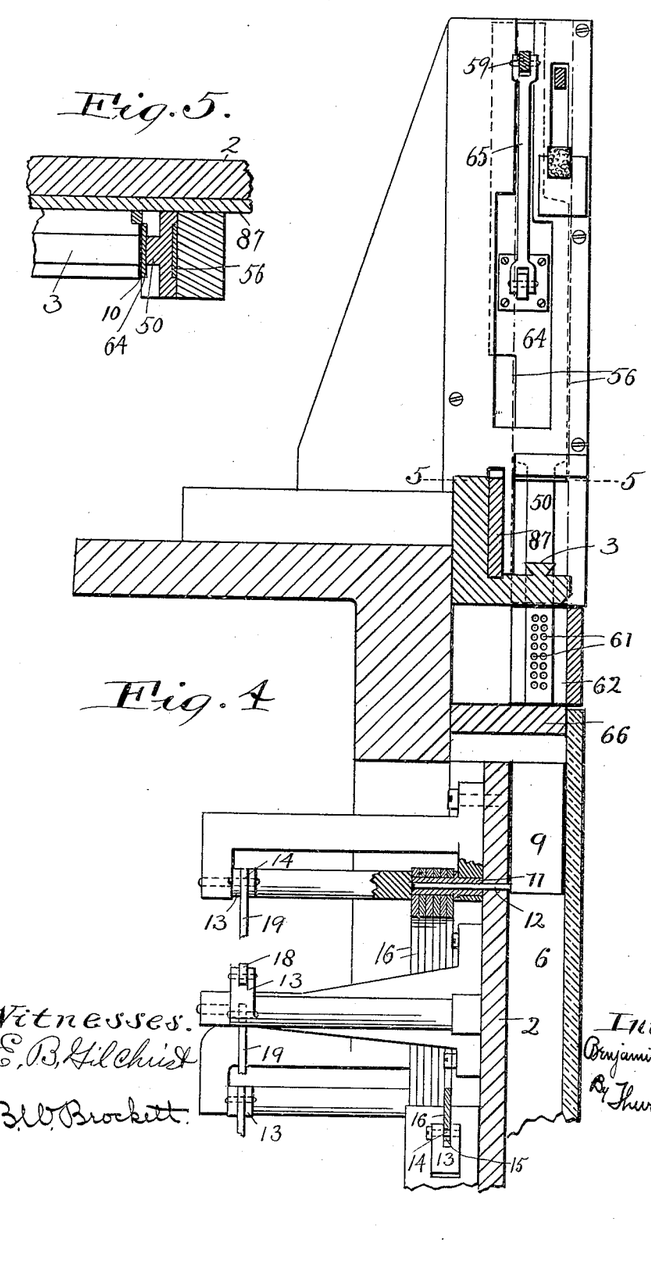
Fig. 4 is a sectional side elevation in the plane indicated by line 4 4 of Fig. 6.
Fig. 5 is a sectional plan view of certain parts in the plane indicated by line 5 5 of Fig. 4.
Figures 6, 7:
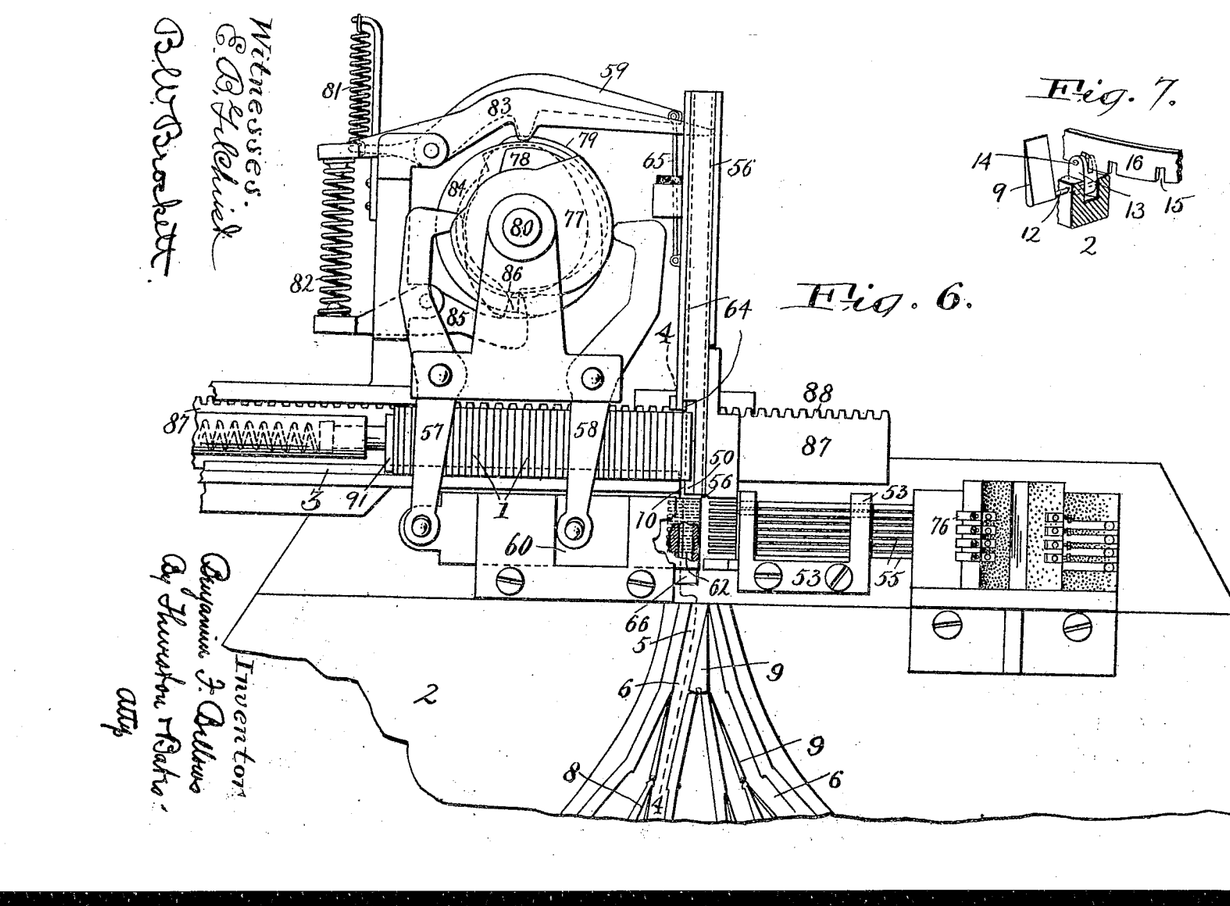
Fig. 6 is a front elevation of the mechanism which includes the novel features of the invention.
Fig. 7 is a perspective detail, partly in section, showing one of the switches, a part of a swinging frame, and the means for transmitting motion from frame to switch.
Figure 8:
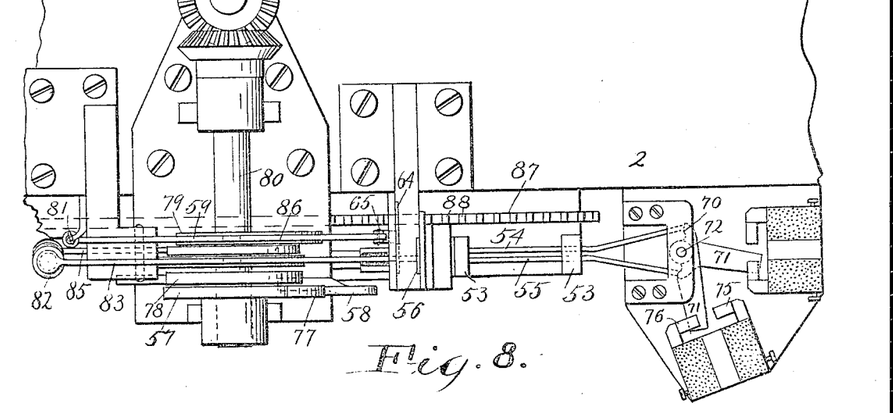
Fig. 8 is a plan of the mechanism shown in Fig. 6.

5 represents the throat of the distributing-channels, and 6 represents said channels, which contain the switches 9. These switches are pivoted at the upper ends of the partitions 8 by which the channels are successively bisected, and these switches are arranged and connected in rows, as shown. The rock-shaft 12, to which each switch is attached, extends through the vertical frame member 2 and has attached to its rear end a crank-arm 13, having a crank-pin 14. The crank-pin associated with the upper switch is connected directly with a link 19. The two switches in the next row have their crank-arms connected together by a bar 18, and one of said crank-arms has its crank-pin connected with another link 19. To operate the other rows of switches, swinging frames 16 are provided, there being six of these frames, all hung on a horizontal stud 11 and all having arc-shaped lower ends. In the outer edges of these arc-shaped lower ends are notches 15, into which the several crank-pins 14 project. Obviously by swinging one of these frames a short distance in one direction or the other the associated switches will be caused to move from one extreme position to the other. Associated with each of these swinging frames is a rocker 40, one arm of which is pivotally connected with an ear 39 on the side of a swinging frame, while the other arm of the rocker is connected with a link 19. All of the links 19 are connected severally with the armature-frames of pairs of electromagnets. The several pairs of magnets are indicated by 20 21, 25 26, 27 28, 29 30, 31 32, 33 34, 35 36, 37 38. The electromagnets of each pair are fixed in alinement, and their armatures 22 23 are connected by rods 24, so that the armatures of both magnets of a pair must move together. These armatures and their connecting-rods may for convenience be referred to as armature-frames. Obviously, if one magnet of any pair is energized by the completion of its circuit it will through the described mechanism cause the movement in one direction of the associated switches. If the other magnet of a pair is energized, it will cause the said switches to move in opposite direction.

Figures 9, 10, 11, 12:
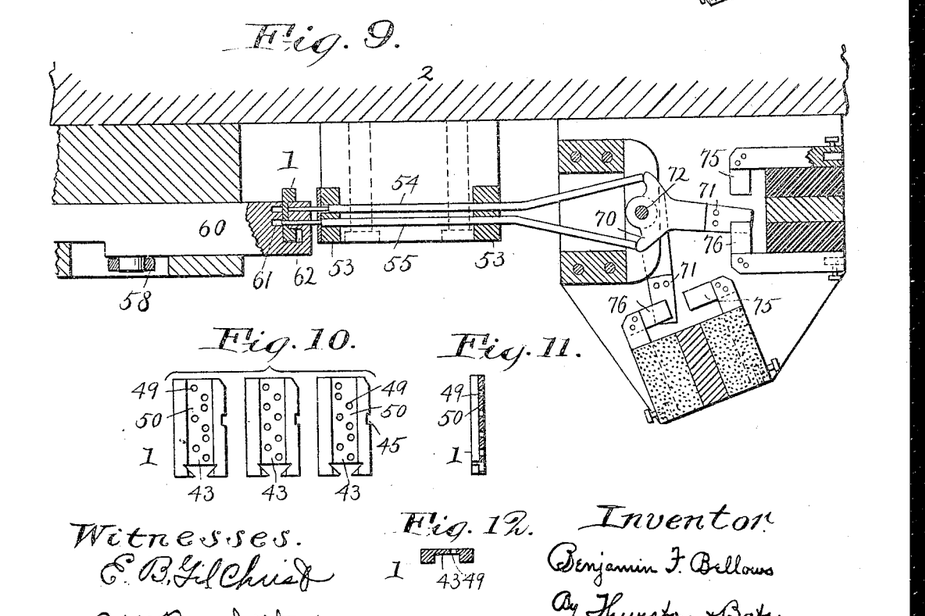
Fig. 9 is a sectional plan view of said mechanism.
Fig. 10 is a side view of three different matrices.
Fig. 11 is a central vertical section of one matrix.
Fig. 12 is a sectional plan view thereof.

So much of the construction as is above described is substantially as shown in said prior application. The matrices 1 employed are also substantially like those which are shown in the prior application referred to. Each is a little block of metal having a character depression 45 on one of its vertical edges and having a vertical groove extending from top to bottom in one side thereof. The grooved or middle part 43 of all of the matrices are of the same thickness. The edges, however, are of different thickness, as may be required for the different characters.

One object of the present invention is to provide means by which each matrix just before it is transferred from the distributing-rail to the throat of the distributing-channels will cause the completion of the circuits of those magnets which will by their action cause the proper rows of switches to move to open up a continuous channel from the throat 5 to the particular magazine 7 of that matrix.

A line of matrices being placed upon the distributing-rail 3 and being moved to the right by suitable mechanism, as stated, are carried against a fixed vertical guide-rib 50, which is of such width that it fits in the vertical groove 43 of the matrix. When in this position, it is directly over an opening 10 through the distributing-rail, or rather over an opening which is formed by cutting off the distributing-rail before it reaches said guide-rib. The matrix is at this time also directly beneath a vertically-movable transfer-slide 64, by which it is forced downward through said opening 10 into a vertical recess 62 in a horizontally-reciprocating slide 60, which is supported on a transfer-rail 66, located below the distributing-rail. The recess in this slide extends from top to bottom, so that when a matrix is pushed down into it said matrix rests upon said transfer-rail.

In the middle or recessed part of each matrix are two vertical rows of holes 49 and contact-surfaces 50. There are places for eight holes in each row; but these holes are arranged in different combinations on different matrices, and a hole in one row is always associated with a contact-surface alongside of it in the other row.

Horizontal rods 54 55 are movable endwise in a fixed block 53, and they project from both sides thereof. Eight of these rods 54 are arranged one above another in a vertical row, and eight other rods 55 are similarly arranged in an adjacent vertical row. Each rod of one row is associated, to form a coöperating pair, with a rod in the same horizontal plane in the other row. The slide 60 is movable right and left upon the horizontal transfer-rail 66. It has in its right end sixteen horizontal holes 61, which extend to and slightly beyond said recess 62 and are alined with said rods 54 55. These holes are also alined with the holes 49 and contact-surfaces 50 of the matrix when the latter is in said recess 62 and is resting upon said transfer-rail.

Each pair of rods 54 55, one in each vertical row, is associated with a metal rocker 70, which is pivoted to a fixed support on a vertical pivot 72 with opposite arms engaging, respectively, with said two rods. Each rocker has a switch-arm 71, adapted to be moved into electrical contact with either of two contact devices 75 76, which are respectively connected with the two electromagnets of a pair which control the movements of a row of switches 9. The rocker 70 is electrically connected with the machine-frame, as is also one pole of the electric generator 4, the other pole of said generator being connected with said electromagnets. When the switch-lever is in contact with one contact device 75 or 76, the circuit of the connected electromagnet will be completed. Said magnet will attract its armature whereby, through the described mechanism, the associated row of switches will be moved to one extreme position. The circuit of the other electromagnet of the pair will be incomplete at this time.

Figure 13:
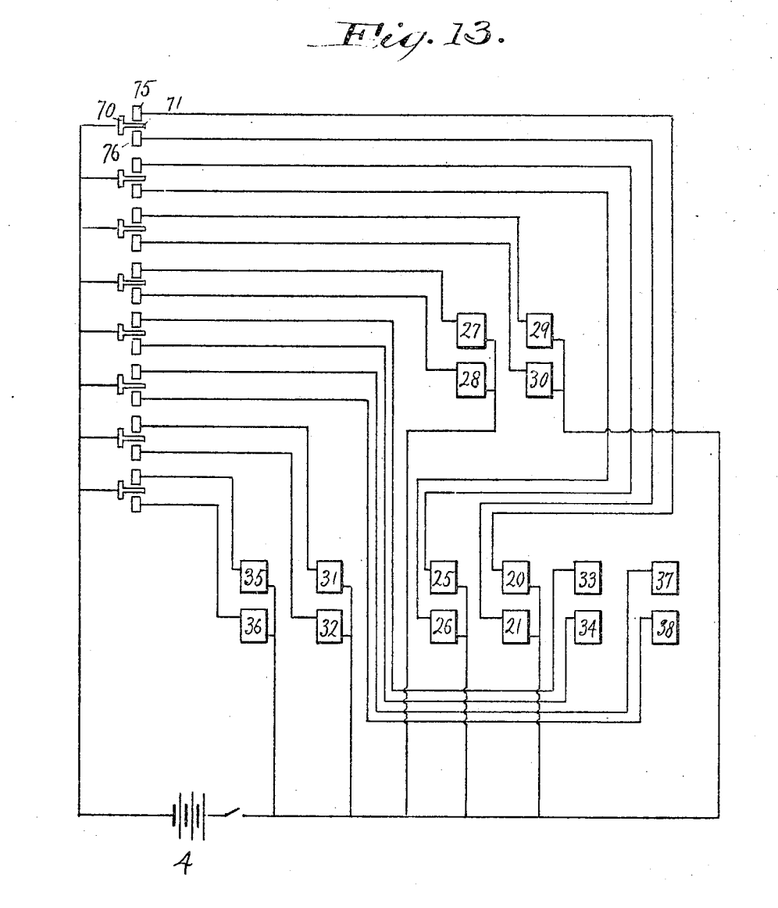
Fig. 13 is a diagrammatic view of the electrical circuits.

Each row of switches is, as stated, associated with a fixed pair of electromagnets. Each pair of magnets is associated with a pair of rods 54 55. Each pair of rods is associated with a rocker 70, and each rocker and its switch-arm is associated with a pair of contact devices 75 76, which are connected with a pair of electromagnets, as stated. The circuits of said magnets are shown diagrammatically in Fig. 13. Each contact device may be a pair of metal springs, between which the arm 71 of the switch-lever will be moved.

When the slide 60 carrying a matrix is moved to the right, one-half of the rods 54 55—some in one vertical row and some in the other—will be struck by the contact-surfaces 50 on the matrix with the result that the rods so struck will be moved endwise. Each rocker 70 which is not already in the required position will be moved by that one of the associated rods which is moved by the matrix. The rod of each pair which is not moved by its matrix will enter a hole 49 in the matrix, wherefore said rod is not moved to the right, but is permitted to move to the left and is actually so moved by its rocker 70. One magnet of each pair will be energized, and therefore each row of gates will be moved to the position (if any of them are not already in the position) required for opening up an unobstructed channel from the throat 5 to the magazine 7 of the particular matrix in the embrace of the slide. Then the slide 60 moves to the left far enough to free the matrix from the rods 54 55 and to bring it over the throat 5. Then the slide 60 stops for an instant, and while it is immovable a vertical movable ejector-slide 56 pushes the matrix down out of slide 60 into the throat 5. It then falls through the open distributing-channel to its own magazine. The slide 60, when the matrix has been ejected, moves further to the left and stops with the recess beneath the hole in the distributing-rail. A vertically-movable transfer-slide 64 moves this matrix down through the hole in the distributing-rail into the matrix-recess 62 in slide 60, which then moves to the right to repeat the previously-described actions, modified in accordance with the matrix it then carries.

The recess 62 in the slide 60 is of such size that the recessed part of the matrices fit it. Wherefore every matrix, whatever may be the thickness of its edges, will fit said recess and will be equally efficient in moving said rods 54 55.

The holes and contact-surfaces on the several matrices are arranged so that each will move those rods 54 55 which by moving will cause the required movement of those switches which will open a clear passage from the throat 5 to the magazine 7 of that particular matrix.

All of the switches do not return to an initial position after each matrix has passed to its magazine as with the mechanism shown in my prior patent mentioned. The switches remain in the position to which they are moved by each matrix and the described mechanism until another matrix causes their reverse movement. The next matrix, therefore, has only to cause the movement of those switches which are not in the required positions. This renders the mechanism much more rapid in its action than is the mechanism in my prior patent.

The proper completion of the circuits of the magnets does not depend upon securing a good electrical contact between the matrix and the ends of needles as with the mechanism of said prior application and prior patent. The mechanism is therefore more reliable in its action.

It will be noticed that some of the contact devices 75 76 are arranged to one side of the others. This is done because there is not room enough to arrange them all one over another. The switch-arm 71 of some rockers is bent forward, so as to lie between those contact devices which are in front of the others.

The three slides 60, 56, and 64 are moved by cams on a constantly-rotating cam-shaft 80. Two pivoted levers 57 58 are connected with slide 60 and engage on opposite sides of two cams 77 78. The transfer-slide 64 is connected by a link 65 with a pivoted lever 59, which engages with a cam 79. The tail of this lever is connected with a spring 81, which acts always to hold the lever against the cam. The spring therefore acts to move this slide downward in the transferring direction, while the cam lifts it in opposition to the spring.

The ejector-slide is required to give the matrix a quick downward impulse, and this is obtained from a compression-spring 82, which is attached to the tail of the lever 83. This lever bears on a cam 84 and engages with the slide 56. This spring is not, however, under much tension except just at the instant when it is called upon to act. Its lower end rests upon the tail of a lever 85, which bears against another cam 86. This cam moves this lever 85 to compress the spring just before the cam 86 allows the lever to act.

The cams 77 78 are of such shape that the slide is moved and stopped positively and without lost motion, just as required for it to properly do its work, as described.

I claim—

1. In matrix-distributing mechanism, the combination of movable distributing-switches connected in groups, devices for moving said groups of switches, and a plurality of matrices each having two series of holes and associated contact-surfaces, with a plurality of pairs of movable mechanical devices arranged substantially as shown whereby when one member of each pair is opposite a hole in a matrix the other member of said pair will be opposite a contact-surface on said matrix, mechanism for moving the matrices, one by one, toward and against said movable mechanical devices whereby those with which the contact-surfaces engage will be moved, and mechanisms which are moved by said movable devices, and which in turn cause the movement of the switch-operating devices.

2. In matrix-distributing mechanism, the combination of movable distributing-switches connected in groups, devices for moving said groups of switches, and a plurality of matrices each having two series of holes and associated contact-surfaces, with a plurality of pairs of endwise-movable horizontal bars arranged substantially as shown whereby when one bar of a pair is opposed to a hole in a matrix, the other bar of said pair will be opposed to the contact-surfaces, mechanism for moving said matrices singly against the ends of said bars whereby those bars with which the contact-surfaces engage will be moved bodily, mechanism by which, when one bar of a pair is moved in one direction by a matrix the other bar of said pair will be moved in the reverse direction, and mechanism operated by said bars for causing the movement of the switch-operating devices.

3. In matrix-distributing mechanism, the combination of movable distributing-switches connected in groups, a pair of electromagnets associated with each group, an armature-frame associated with each pair of magnets, and mechanisms severally transmitting motion from said armature-frames to the groups of switches, a pair of movable devices associated with each pair of magnets, electric switches operated by said movable devices for making and breaking the circuits of said magnets, a plurality of matrices having two groups of holes and contact-surfaces of which one hole and one contact-surface are associated with each pair of movable devices, mechanism for moving the matrices one by one against said movable devices, and mechanism which operates when the matrix moves one device of a pair in one direction, to move the other device of said pair in the opposite direction.

4. In matrix-distributing mechanism, the combination of movable distributing-switches connected in groups, a pair of electromagnets associated with each group, and switch-operating mechanisms associated severally with the groups of switches and operable by said electromagnets, a plurality of pairs of endwise-movable horizontal rods, a rocker associating each pair of rods for engaging therewith, electric switches for the associated pairs of magnets and severally controlled by said rockers, and a series of matrices each having two series of holes and associated contact-surfaces which may be brought into opposition to the endwise-movable rods, and mechanism for moving said matrices against said rods to move the same.

5. In matrix-distributing mechanism, the combination of a distributing-rail having an opening, a vertical guide-rib at the edge of said opening, a plurality of matrices each having in one face a vertical groove to which said guide-rib is fitted, mechanism for moving a line of matrices along the distributing-rail toward said guide-rib, a vertically-movable transfer-slide adapted to move the matrix which engages said guide-rib down through the hole in the distributing-rail, a reciprocating slide having a recess to receive said matrix as it is so moved downward, a plurality of pairs of movable devices against which the matrix in said recess is moved by said slide, switch-operating mechanism which is caused to operate by the movement of said devices, and a slide for ejecting the matrix downward out of the recess in said slide, said matrices having in their recessed part a plurality of pairs of holes and contact-surfaces which are severally opposed to said movable devices when the matrix is in the recess of said reciprocating slide.

6. In matrix-distributing mechanism, containing diverging distributing-channels which discharge into matrix-magazines and have a distributing-throat, the combination of movable switches in said channels, a transfer-rail above the distributing-throat, a reciprocating slide having a matrix-recess, a distributing-rail above said slide having a hole through it, mechanism for transferring the matrices singly from said distributing-rail through such hole down into said matrix-recess, mechanism for ejecting the matrix from said recess into said distributing-throat, and switch-operating mechanisms which are caused to move by the matrix in said recess.

7. In matrix-distributing mechanism, the combination of a reciprocating slide having a matrix-recess and having two series of holes extending from its front end to said matrix-recess, a plurality of endwise-movable horizontal rods arranged with their ends in alinement with said holes, electric switches operated by said rods, and a plurality of matrices having different combinations of holes and contact-surfaces so placed that when a matrix is in a recess of the slide said holes and contact-surfaces will be in line with said rods and with the holes in the slide, and mechanism by which when one half of said rods move in one direction the other half move in the reverse direction.

8. In a matrix-distributing machine containing distributing-channels having a distributing-throat, the combination of a transfer-rail above said throat, a reciprocating slide on said rail having a matrix-recess, a distributing-rail above said slide having a hole through it, mechanism for transferring the matrices singly from said distributing-rail through said hole into said matrix-recess, and mechanism for ejecting the matrix from said recess into said distributing-throat.

9. In a matrix-distributing machine containing distributing-channels having a distributing-throat, the combination of a transfer-rail above said throat, a slide on said rail having a matrix-recess, a distributing-rail above said slide having a hole through it, mechanism for transferring the matrices singly from said distributing-rail through said hole into the matrix-recess in said slide, and mechanism for discharging the matrix from said recess into said distributing-throat, and levers and cams by which said slide is reciprocated.

10. In a matrix-distributing machine containing distributing-channels having a distributing-throat, the combination of a transfer-rail above said throat, a reciprocating slide on said rail having a matrix-recess, a distributing-rail above said slide having a hole through it, a vertically-movable transfer-slide for moving the matrices singly down through the hole in the distributing-rail into the recess in said slide, and a vertically-movable ejector-slide for forcing the matrices from said recess into said distributing-throat.

11. In a matrix-distributing machine containing distributing-channels having a distributing-throat, the combination of a transfer-rail above said throat, a reciprocating slide on said rail having a matrix-recess, a distributing-rail above said slide having a hole through it, a vertically-movable transfer-slide for moving the matrices singly down through the hole in the distributing-rail into the recess in said slide, and a vertically-movable ejector-slide for forcing the matrices from said recess into said distributing-throat, levers for operating said vertically-movable slides, and cams and springs for operating said levers.

12. In a matrix-distributing machine containing distributing-channels having a distributing-throat, the combination of a transfer-rail above said throat, a reciprocating slide on said rail having a matrix-recess, a distributing-rail above said slide having a hole through it, a vertically-movable transfer-slide for moving the matrices singly down through the hole in the distributing-rail into the recess in said slide, a vertically-movable ejector-slide for forcing the matrices from said recess into said distributing-throat, a lever for operating said distributing-slide, a cam and spring for operating said lever, a lever for operating the ejector-slide, a cam for lifting said lever, a spring for moving the lever in the opposite direction, and means for putting said spring under tension just before the cam permits the downward movement of said lever.

13. In a matrix-distributing mechanism, which include distributing-channels having a distributing-throat, said channels containing a plurality of switches connected in groups, a pair of electromagnets associated with each group of switches, an armature-frame associated with each pair of magnets, and mechanism transmitting motion from each armature-frame to the associated group of switches, an electrical contact device connected with each magnet of a pair, a switch-lever adapted to be moved into contact with one or the other of said contact devices, a pair of endwise-movable rods associated with each lever and engaging therewith on opposite sides of its pivot, and a set of matrices each having holes and contact-surfaces arranged in pairs, of which each pair consists of a hole and a contact-surface, and means for forcing the matrix against the ends of said movable rods, substantially as and for the purpose specified.

14. In matrix-distributing mechanism, the combination of two vertical rows of endwise-movable horizontal rods, said rods being associated in pairs, and an electrical switch associated with each pair of rods and adapted to be moved thereby, a pair of electromagnets associated with each switch, and terminal contact-pieces which are connected severally with said electromagnets and are adapted to be severally engaged by the associated switch.

15. In matrix-distributing mechanism, the combination of two vertical rows of endwise-movable horizontal rods, said rods being associated in pairs, an electrical switch associated with each pair of rods and adapted to be moved thereby, a pair of electromagnets, each magnet having a terminal contact-piece, which contact-pieces coöperate with said switches, a plurality of groups of distributing-switches, and mechanism whereby each group is operated by a pair of magnets, a set of matrices having holes and contact-surfaces differently arranged, and means for forcing said matrices singly against the ends of said rods.

16. In matrix-distributing mechanism, the combination of two vertical rows of endwise-movable horizontal rods associated in pairs, one in each vertical row, with the following mechanisms associated with each pair of rods, viz., a rocker which engages with the associated rods on opposite sides of its pivot and has a switch-arm, a pair of electromagnets having respectively contact devices which lie on opposite sides of said switch-arm and are adapted to be engaged thereby.

In testimony whereof I hereunto affix my signature in the presence of two witnesses.

BENJAMIN F. BELLOWS.

Witnesses:
E. B. GILCHRIST,
E. L. THURSTON.